(12) United States Patent
Alshawaf

(10) Patent No.: US 8,850,963 B1
(45) Date of Patent: Oct. 7, 2014

(54) AUTOMATIC MULTIPLE-STAGE COOKING MACHINE

(71) Applicant: Shawaf Mohammed Alshawaf, Mishrif (KW)

(72) Inventor: Shawaf Mohammed Alshawaf, Mishrif (KW)

( * ) Notice: Subject to any disclaimer, the term of this patent is extended or adjusted under 35 U.S.C. 154(b) by 0 days.

(21) Appl. No.: 14/139,737

(22) Filed: Dec. 23, 2013

(51) Int. Cl.
*A47J 37/06* (2006.01)
*A47J 37/04* (2006.01)

(52) U.S. Cl.
CPC ................................ *A47J 37/041* (2013.01)
USPC ............................................................ 99/332

(58) Field of Classification Search
USPC ........... 99/339, 340, 325, 326, 327, 331, 332, 99/357, 403, 409, 416, 427, 426, 448, 484, 99/449
See application file for complete search history.

(56) References Cited

U.S. PATENT DOCUMENTS 5,070,774 A   12/1991  Rosso et al.
5,588,352 A   12/1996  Harrison
5,881,632 A *  3/1999  Fadoul ............................ 99/326
2010/0255168 A1  10/2010  Roth
2012/0204733 A1   8/2012  Dennis

FOREIGN PATENT DOCUMENTS

EP      1685781     *  8/2006
GB      2 052 247 A   1/1981

* cited by examiner

*Primary Examiner* — Dana Ross
*Assistant Examiner* — Joseph Iskra
(74) *Attorney, Agent, or Firm* — Richard C Litman

(57) ABSTRACT

An automatic multiple-stage cooking machine for food preparation includes a housing having an upper area and a lower area with an elongate member in the upper area. The elongate member has one or more sections to receive a liquid or a food which is then heated by a first heating element controlled by a controller. After the liquid or food is heated it is deposited by a drive mechanism controlled by the controller from the elongate member into one or more containers positioned below on a platform located in the lower area of the housing. The one or more containers receive the heated liquid or heated food and an additional liquid or an additional food for combining together or can include an additional liquid or additional food alone. A second heating element controlled by the controller heats the one or more containers for the preparation of dishes.

16 Claims, 5 Drawing Sheets

AUTOMATIC MULTIPLE-STAGE COOKING MACHINE

BACKGROUND OF THE INVENTION

1. Field of the Invention

The present invention relates to food preparation, and particularly to an automatic multiple-stage cooking machine for the preparation of dishes.

2. Description of the Related Art

In today's modern lifestyle finding time to prepare a meal can be difficult. Additionally, certain dishes can require a substantially larger amount of time to prepare compared to other dishes because of the various cooking utensils and cookware needed to prepare and complete the dish. For example, certain Arabian dishes such as Kabsa need various utensils and cookware like pots and pans to fully prepare the meal. A current approach for preparing Kabsa can involve the use of a pressure cooker to cook a meat food material, a frying pan to prepare a vegetable food material, and a pot with water to boil a rice food material, among other food materials and cookware. This current approach can take a substantial amount of time, something that many people today with their lifestyle cannot afford. Further, another potential drawback with this approach is that using various utensils and cookware can add to the complexity of preparing the dish, which can make preparation difficult for some individuals.

It is desirable for a cooking machine to prepare dishes in a relatively shorter time period and in a relatively simpler approach.

Thus, an automatic multiple-stage cooking machine addressing the aforementioned problems is desired.

SUMMARY OF THE INVENTION

Embodiments of an automatic multiple-stage cooking machine are provided. The automatic multiple-stage cooking machine includes a housing having an upper area and a lower area with an elongate member positioned within the upper area. The elongate member has one or more sections that are each adapted to receive a liquid or a food material. A first heating element is in communication with the elongate member to heat the sections containing the liquid or food material. Once the liquid or food material is heated in the one or more sections by the first heating element the heated liquid or heated food material is deposited from the elongate member by a drive mechanism below into one or more containers positioned on a platform that is located in the lower section of the housing.

The one or more containers are adapted to receive the heated liquid or heated food material from the elongate member above together with an additional liquid or an additional food material for combining the heated liquid or heated food material with the additional liquid or additional food material or the one or more containers can be adapted to receive an additional liquid or additional food material alone. A second heating element is in communication with the platform to heat the one or more containers for the preparation of a dish. The activation and control of the first and second heating elements and the drive mechanism is performed by automation through a controller.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
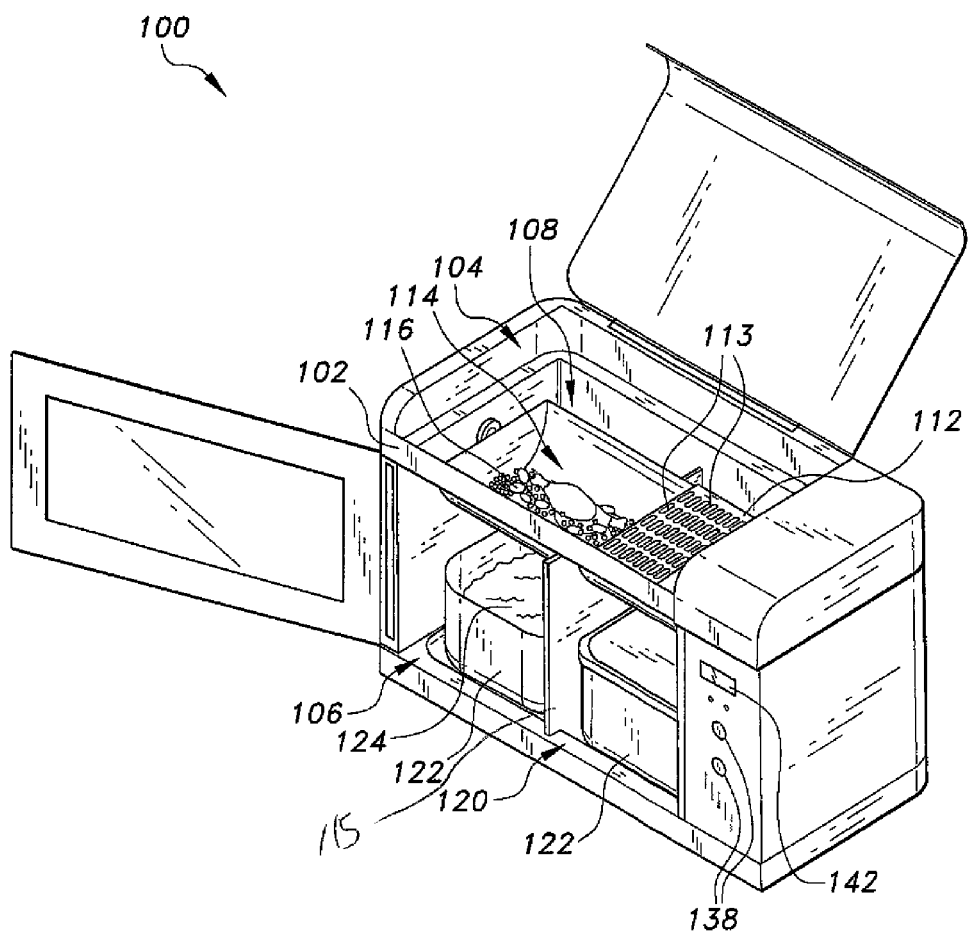
FIG. 1 is a perspective view of an embodiment of an automatic multiple-stage cooking machine according to the present invention.

Referring to FIG. 1, an embodiment of an automatic multiple-stage cooking machine 100 is shown. The automatic cooking machine 100 includes a housing 102 having an upper area 104 and a lower area 106. The housing 102 can be made from any durable material found in other common cooking appliances, for example stainless steel, among other materials. The upper area 104 of the housing 102 is located at a top region of the housing 102 and includes an elongate member 108 positioned within the upper area 104.

The elongate member 108 includes one or more sections 114 that are adapted to receive a liquid or food material 116 to be prepared. The elongate member 108 can take any suitable shape or size, such as a concave tray as shown in FIG. 1 that allows for a user to position the liquid or food material 116 within a section 114 of the elongate member 108. The liquid or food material 116 can be any number of liquids or food materials. For example, the liquid or food material 116 can be water, broth, oil, or chicken stock, among others. Another example is that the liquid or food material can be beef, chicken, lamb, or pork, among others.

A removably securable separator 112 can be implemented in conjunction with the elongate member 108 to form one or more sections 114 for separation of the liquid or food material 116 located in a section 114 from another liquid or food material 116 located in another section 114. Further, as shown in FIG. 1, the separator 112 can also be adapted to receive a liquid or food material 116 directly, for example by apertures 113 on a surface of the separator that can allow for a liquid or food material 116, such as water, to be inserted within an interior of the separator 112, or the separator 112 can be adapted to be fully or partially removed from the elongate member 108 to allow for a liquid or a food material to be placed therein in a corresponding section 114, for example.

The separator 112 can also have various dimensions depending on the user's needs. For example, the separator 112 can have a height that is greater than the depth of the elongate member 108. By having a height greater than the depth of the elongate member 108, if a liquid or food material 116 were to be placed within the separator 112, the liquid or food material can be removed from within the separator 112 if the elongate member 108 were to be rotated. The separator 112 can also have a height that is equal to the depth of the elongate member 108. By the separator 112 having a height equal to the depth of the elongate member 108, food material 116 that is positioned within the separator 112 in a corresponding section 114 can remain within the interior of the separator 112 if the elongate member 108 were to be rotated, but a liquid in the separator 112 in the corresponding section 114 can be allowed to pass through the apertures 113 when the elongate member 108 is rotated, or a liquid vapor can pass through the apertures 113 when the liquid is heated, for example, such as to form a broth.

Further, the separator 112 can have a height that is less than the depth of the elongate member 108. By having a height less than the depth of the elongate member 108, a liquid or a food material 116 can move between the one or more sections 114. For example, if a liquid or food material 116 were to be placed within one section 114 and another liquid or food material 116 were to be placed within another section 114, the liquid, such as water, can travel between or among the sections 114. Also, if a user were to add a third liquid or food material 116, such as water, into either one or more sections 114 including a food or liquid material 116, or into another section 114, the liquid, such as water, as it heats, for example, can travel between or among the one or more sections 114. If the heated liquid, such as water or other liquid type food material, travels between the one or more sections 114 containing a liquid or food material 116, a broth or other liquid type food material, can be made, for example, from the one or more liquids or food materials 116 that are in the one or more sections 114.

Figure 2:
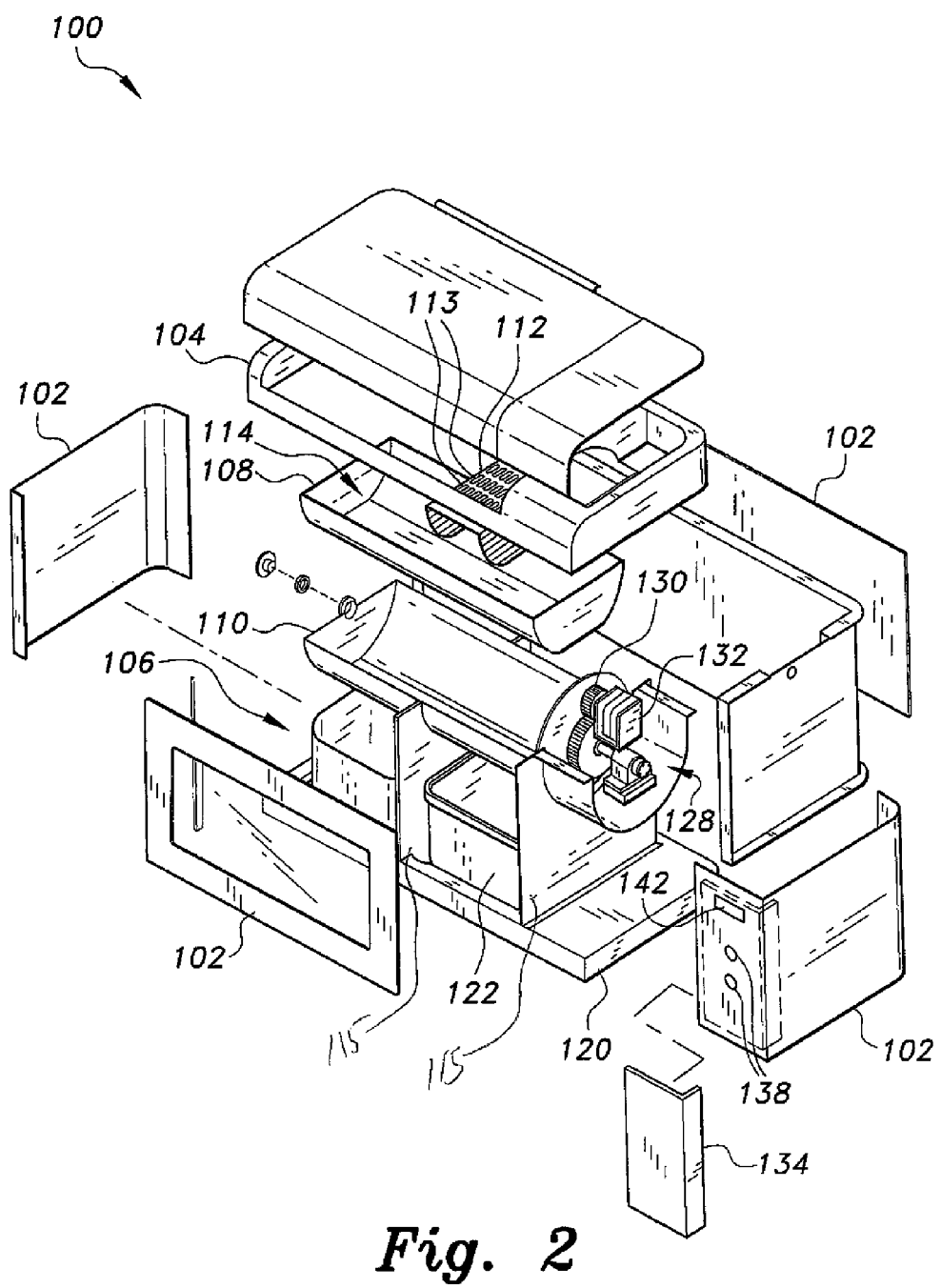
FIG. 2 is a partial exploded view of an embodiment of an automatic multiple-stage cooking machine according to the present invention.
Figure 4:
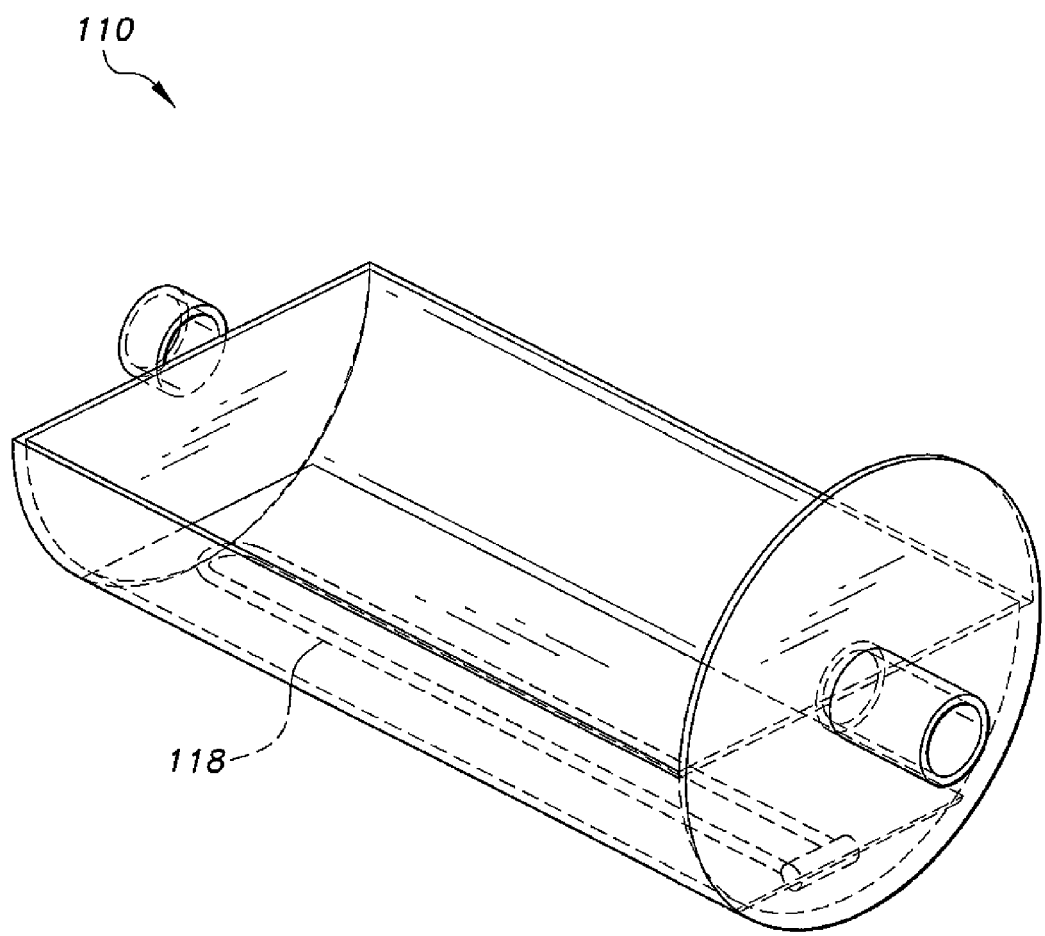
FIG. 4 is a perspective view of an embodiment of a holding member of embodiments of an automatic multiple-stage cooking machine according to the present invention.

Referring to FIGS. 2 and 4, the elongate member 108 can be positioned within a holding member 110. The holding member 110 can removably support the elongate member 108 in the upper area 104 of the housing 102. Further, the holding member 110 can have any suitable shape that can allow for the elongate member 108 to be positioned within and removable from the holding member 110. For example, the holding member 110 can have a concave shape to removably support a correspondingly concave shaped elongate member 108.

A first heating element 118 is placed in communication with the elongate member 108 to correspondingly heat the one or more sections 114 of the elongate member 108. The first heating element 118 can be positioned in any suitable manner that allows for the heat generated by the first heating element 118 to be delivered to the one or more sections 114. For example, the first heating element 118 can be positioned across a surface of the elongate member 108. Additionally, in another embodiment, the first heating element 118 can be placed onto a surface of the holding member 110, as shown in FIG. 4, which still allows for the heat generated by the first heating element 118 to be delivered to the one or more sections 114 of the elongate member 108. The first heating element 118 can also come in any suitable configuration, such as a single heating element 118 as shown in FIG. 4 or as a plurality of heating elements 118, for example.

Located below the upper area 104 of the housing 102 is positioned a platform 120 in the lower area 106. The platform 120 is adapted to receive one or more containers 122 in the lower area 106 of the housing 102. The one or more containers 122 can be adapted to receive an additional liquid or food material 124 that can be the same or different from the liquid or food material 116 placed and heated above within the one or more sections 114 of the elongate member 108. For example, the additional liquid or food material 124 could be water or it could be lamb.

Further, the one or more containers 122 are adapted to receive the heated liquid or food material 116 and the additional liquid or food material 124 to allow for the combination of the heated liquid or food material 116 with the additional liquid or food material 124 together to prepare a combined liquid product or a combined food product. The one or more containers 122 can take any suitable size or shape that allows for placement within the lower area 106 in conjunction with the platform 120 and also allows for the reception of the heated liquid or food material 116 from the upper area 104 that has been heated in the elongate member 108 by the heating element 118 and the additional liquid or food material 124. For example, the one or more containers 122 can be in the shape of a bowl or tray, among other sizes and shapes. Further, the one or more containers 122 can be adjusted to be removably securable from the lower area 106, allowing for the user to retrieve the combined liquid product or the combined food product and place on a plate or other serving device.

Figure 5:
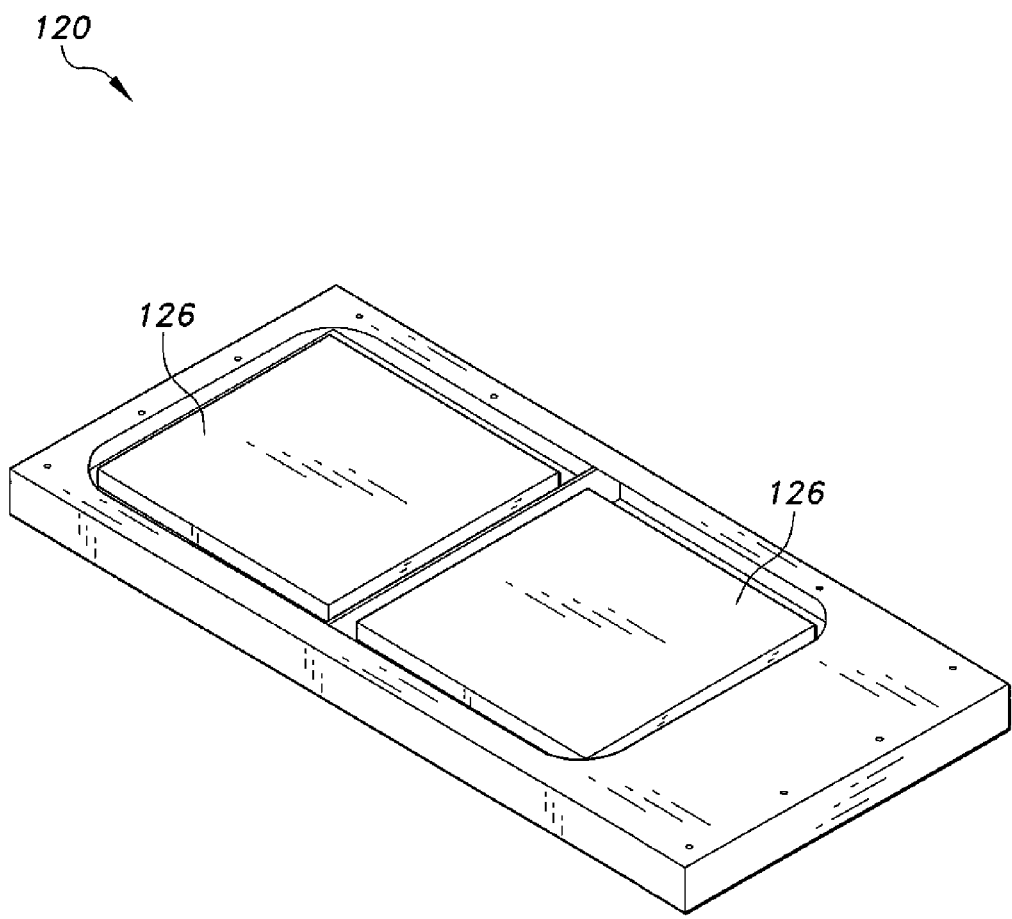
FIG. 5 is a perspective view of an embodiment of a platform of embodiments of an automatic multiple-stage cooking machine according to the present invention.

The platform 120 is also adapted to be in communication with a second heating element 126. The second heating element 126 can correspondingly heat the one or more containers 122 and can be positioned in any manner in relation to the platform 120 and the lower area 106 of the housing 102, such as mounted within recesses of the platform 120 as shown in FIG. 5. Further, the second heating element 126 can be in a number of arrangements, such as a plurality of heating elements 126 as shown in FIG. 5, or as a single heating element 126 similar to the first heating element 118 shown in FIG. 4, among other forms. At least one divider 115 as seen in FIGS. 1 and 2, provide auxiliary support to the holding member 110, as well as form partitions between each of the plurality of containers 122. The dividers also separate the liquid or food material being transferred from the upper level to the lower lever into each of the containers 122.

Continuing with FIG. 2, a drive mechanism 128 can act to rotate the elongate member 108 while the elongate member 108 is positioned within the holding member 110. Additionally, in further embodiments, the drive mechanism 128 can be connected in a manner that allows for rotation of the elongate member 108 without the need of the holding member 110. The drive mechanism 128 includes a plurality of gears and ball bearings 130 and a motor 132. The plurality of gears and ball bearings 130 can be any common gears and ball bearings found in appliances, for example a spur gear, among other types. Further, the motor 132 can be any common motor found in appliances, for example a stepping motor, or a servo motor, or a digital servo motor, among other suitable types.

When activated, the drive mechanism 128 can move and rotate the elongate member 108, allowing for any liquid or food material 116 located within the one or more sections 114 to be mixed by maneuvering the elongate member 108 in a back and forth rotatable manner by adjusting the drive mechanism 128 for relatively slight rotations. Further, the drive mechanism 128 can also rotate the elongate member 108 for a further rotation to allow the liquid or food material 116 located within the one or more sections 114 of the elongate member 108 to be deposited into the one or more containers 122 positioned correspondingly below within the lower area 106.

Figure 3:
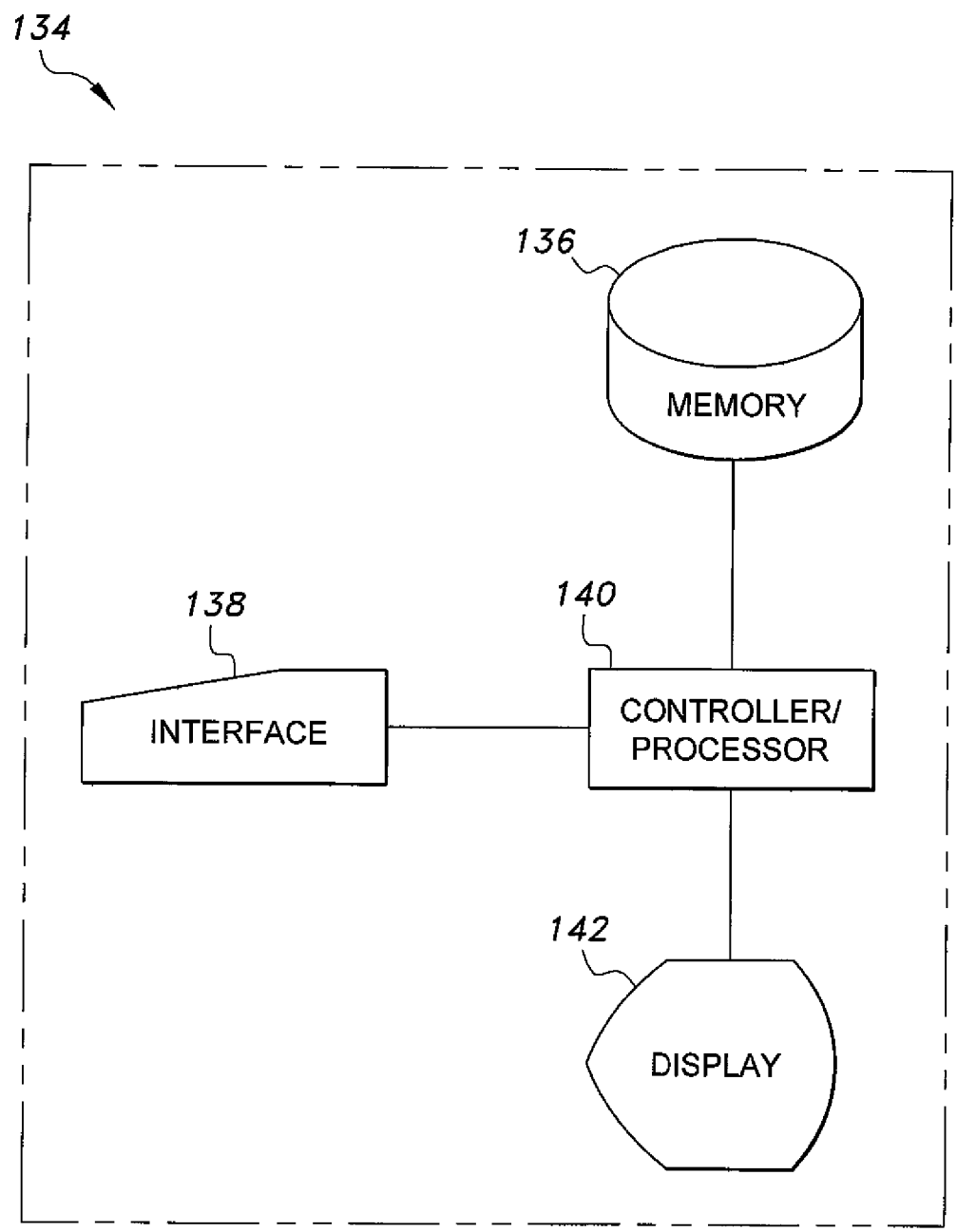
FIG. 3 is a schematic diagram of an embodiment of a controller of embodiments of an automatic multiple-stage cooking machine according to the present invention.

Referring to FIGS. 2 and 3, a controller 134 is positioned in an area within the housing 102 that allows for communication between the controller 134 and the first heating element 118, the controller 134 and the drive mechanism 128, and the controller 134 and the second heating element 126. The controller 134 is in communication with the drive mechanism 128 to activate the drive mechanism 128 to selectively move and rotate the elongate member 108. The selective movement controlled through the controller 134 can allow for mixing of the liquid or food material 116 positioned within the one or more sections 114 of the elongate member 108 or can allow for the depositing of the liquid or food material 116 into the corresponding one or more containers 122 to combine the liquid or the food material 116 in the one or more sections 114 of the elongate member 108 with the additional liquid or the additional food material 124 in the corresponding one or more containers 122 to prepare a combined liquid product or a combined food product.

In addition to controlling the activation and movement of the drive mechanism 128, the controller 134 also selectively controls the activation of and heat delivered by the at least one first heating element 118 and the at least one second heating element 126. The controller 134 can control the time period of the activation and the delivery of heat, and can further control the amount of heat delivered and the cooking temperature. Further, if the first heating element 118 or the second heating element 126 comes in the arrangement of a plurality of heating elements, the controller can vary the amount of heat delivered and the time period of heat delivered between the plurality of heating elements. For example, if the second heating element 126 is in the arrangement of two heating elements as shown in FIG. 5, controller 134 can adjust the heat delivered and the time period the heat is delivered to be different between the two heating elements. This feature of the controller allows for an additional liquid or additional food material 124 in separate containers 122 to be cooked at different temperatures or for different lengths of time. By allowing automation through the controller 134, the automatic multiple-stage cooking machine 100 can cook in multiple stages.

For example, the controller 134 can activate and deliver heat to the first heating element 118, with this stage of cooking being a first stage of cooking the liquid or food material 116 at one or more same or different temperatures for one or more same or different lengths of time. Further, after the liquid or food material 116 is heated by the first heating element 118 and the first stage of cooking is completed, the first stage cooked liquid or food material 116 during at least for one period of time is deposited within the corresponding one or more containers 122. The controller 134 can during a second stage of cooking activate and deliver heat to the second heating element 126 to heat at one or more same or different temperatures for one or more same or different lengths of time the one or more containers 122 in which the now heated deposited liquid or food material 116 from the elongate member 108 combined with the additional liquid or food material 124 already placed within the one or more containers 122 can cook together during the second stage of cooking.

Referring to FIG. 3, the controller 134 includes a memory 136, an interface 138, a controller/processor 140, and a display 142. The interface 138 can come in any suitable form, such as a plurality of buttons, as shown in FIGS. 1 and 2, or an integrated circuit type device, for example. The controller/processor 140 can be any common or suitable type of controller/processor or computer implemented device found in appliances, such as a power circuit board, a system on chip (SOC) processor, an application specific integrated circuit (ASIC), a programmable logic controller, or a computer processor, for example. The display 142 can be a suitable digital display on an exterior surface of the housing 102, as shown in FIGS. 1 and 2. The memory 136 can include a suitable memory, such as non-transitory storage media, a magnetic recording apparatus, or a semiconductor memory (for example, RAM, ROM, etc.), for example. One or more programs or a set of instructions for operation of the automatic multiple-stage cooking machine 100 and to implement the cooking process therein can be stored in the memory 136. The display 142, the controller/processor 140, the memory 136 and the interface 138 are in communication with one another by any suitable type of data bus, as is well known in the art. In addition to the controller 134, a switching power supply can be included with the automatic multiple-stage cooking machine 100.

If a user wants to prepare a certain dish with the automatic multiple-stage cooking machine 100, for example the Arabian dish Kabsa, the user can follow a method involving the following steps, for example. The user can place a chicken food material in a section 114 of the elongate member 108 and place a vegetable food material within the interior of the separator 112. The user can then place water in another section 114 of the elongate member 108 or the user can place water in the section 114 containing the chicken food material or the user can place the water within the interior of the separator 112 alongside the vegetable food material by pouring the water through the apertures 113 of the separator 112.

Once the user has placed the appropriate liquid or food material 116 in the one or more sections 114 of the elongate member 108, the user can place an additional liquid or food material 124 into the one or more containers 122. For example, in a container 122, the user can place a rice food material and water in a container 122 that is positioned below the area that corresponds to the separator 112. In another container 122, the user can place cooking oil liquid in the other container 122 that is positioned below the area that corresponds to the section 114 having the chicken food material.

Once the user has placed the appropriate liquid or food material 116 in the one or more sections 114 and has placed the appropriate additional liquid or food material 124 in the one or more containers 122, the user can then press, for example, one or more buttons on the interface 138 located on the housing 102 of the automatic multiple-stage cooking machine 100 to enter in the time periods required for each stage of the multiple-stage cooking process. Or, additional embodiments of an automatic multiple-stage cooking machine 100 can be preprogrammed, such as with one or more programs stored in the memory 136, with specific time periods already set for each stage of cooking correlating to specific dishes, such as Kabsa, so that a user can simply press a start button on the interface 138. Further, additional embodiments of the automatic multiple-stage cooking machine 100 can be manually programmed by the user to perform as many cooking stages as the user requires, such as a single stage or three stages, for example.

Continuing with a method of preparing the dish Kabsa using an automatic multiple-stage cooking machine 100, a time period of about 1.5 hours is suggested, for example, for a first stage of automatic cooking that includes the heating of the liquid or food material 116 placed within the one or more sections 114 of the elongate member 108 to cook the chicken food material in the one section 114 and the vegetable food material located within the interior of the separator 112, and to heat or boil the liquid, such as water, as can be located in one or more of the sections 114 including the vegetable food material or the chicken food material or can be located in another section 114 of the elongate member 108. During the first stage of automatic cooking, as the chicken food material and vegetable food material cook in the corresponding sections 114 and the water is heated, the water can travel freely, such as in a liquid or a vapor form, between the chicken food material and the vegetable food material so that a broth is formed.

For a second stage of automatic cooking that includes an additional liquid or food material 124 placed within the one or more containers 122 being heated together with the heated liquid or food material 116 deposited therein, such as by rotation of the elongate member 108, a time period of about 0.5 hours is recommended, for example, to cook the now heated liquid or food material 116 combined with the additional liquid or food material 124 for cooking the chicken food material from the above section 114 in the cooking oil liquid in the container 122 and to cook the broth made above from another section 114 together with the rice and water in the other container 122. The user can manually enter into the interface 138 the time period of about 1.5 hours for the first stage of the multiple-stage cooking process and about 0.5 hours for the second stage of the multiple-stage cooking process, for example. Or, if the embodiment of the automatic multiple-stage cooking machine 100 has the interface 138 being activated corresponding to preprogrammed time periods set to prepare a Kabsa dish, the user, for example, can simply press a start button on the interface 138 to initiate and complete the first and second cooking stages of the automatic multiple-stage cooking machine 100.

In this regard, after the about 1.5 hours have elapsed, for example, the drive mechanism 128 is activated automatically by the controller 134 to rotate the elongate member 108 to deposit the heated chicken food material into the corresponding container 122 having the cooking oil liquid and to deposit the broth into the corresponding container 122 having the rice food material and water. Once the heated liquid or food material 116 is combined with the additional liquid or food material 124, the controller 134 automatically activates the second heating element 126 which in turn delivers heat to the container 122 having the chicken food material and the cooking oil to fry the chicken food material in the cooking oil and delivers heat to the container 122 having the rice, water, and broth to cook the rice, water, and broth combination in the other container 122.

After the time period of about 0.5 hours has elapsed for the second stage of cooking, for example, both the first stage and the second stage of the automatic cooking machine 100 have been completed for the dish Kabsa, as an example. The user can then remove the containers 122 from lower area 106 of the housing 102. This can be accomplished by opening a door positioned on the housing 102 of the automatic multiple-stage cooking machine 100, as shown in FIG. 1. The user can also remove the cooked vegetables from within the separator 112, and with the contents of both containers 122 can place all the food items on a serving plate. The user can garnish to their preference and serve the finished Kabsa dish.

It is to be understood that the present invention is not limited to the embodiments described above, but encompasses any and all embodiments within the scope of the following claims.

I claim:

1. An automatic cooking machine, comprising:
a housing, the housing including an upper area and a lower area;
an elongate member, the elongate member rotatably positioned within the upper area of the housing, the elongate member having one or more sections, each section adapted to receive a liquid or a food material;
at least one first heating element, the at least one first heating element being positioned in communication with the elongate member to correspondingly heat the one or more sections of the elongate member;
a platform, the platform positioned within the lower area of the housing, the platform being adapted to receive a plurality of containers in the lower area of the housing, the plurality of containers adapted to receive an additional liquid or an additional food material;
at least one second heating element, the at least one second heating element being positioned in communication with the platform to correspondingly heat the plurality of containers;
a drive mechanism, the drive mechanism arranged in communication with the elongate member to selectively move the elongate member;
a controller, the controller in communication with the drive mechanism to activate the drive mechanism to selectively move the elongate member and to transfer the liquid or food material in the one or more sections into the corresponding plurality of containers to combine the liquid or the food material in the one or more sections of the elongate member with the additional liquid or the additional food material in the corresponding plurality of containers to prepare a combined liquid product or a combined food product, the controller selectively controlling activation of and heat delivered by the at least one first heating element and by the at least one second heating element; and
at least one divider disposed adjacent to at least one of the plurality of containers so as to separate the liquid or food material upon the transfer from the elongate member to the plurality of containers;
wherein the at least one divider provides additional structural support for the elonzate member.

2. The automatic cooking machine according to claim 1, wherein the drive mechanism includes a plurality of gears and ball bearings, and a motor.

3. The automatic cooking machine according to claim 2, wherein the plurality of gears are spur gears.

4. The automatic cooking machine according to claim 2, wherein the motor is selected from the group consisting of a stepping motor, a servo motor and a digital servo motor.

5. The automatic cooking machine according to claim 1, wherein the controller selectively controls heating of the at least one first heating element at one or more temperatures for one or more corresponding first time periods, the controller selectively activates the drive mechanism for at least one second time period to selectively move the elongate member, and the controller selectively controls heating the at least one second heating element at one or more temperatures for one or more corresponding third time periods, in preparing the combined liquid product or the combined food product.

6. The automatic cooking machine according to claim 1, wherein the elongate member includes at least one removably securable separator to form a plurality of sections to separate a liquid or a food material from another liquid or another food material in the elongate member.

7. The automatic cooking machine according to claim 1, wherein the controller selectively controls heating of the at least one first heating element at one or more first temperatures for one or more corresponding first time periods during a first stage of preparing the liquid product or the food product, and after completion of the first stage, the controller selectively activates the drive mechanism to selectively move the elongate member to combine the liquid or the food material in the one or more sections of the elongate member with the additional liquid or the additional food material in the corresponding one or more containers.

8. The automatic cooking machine according to claim 7, wherein, after combining the liquid or the food material with the additional liquid or the additional food material, the controller selectively controls heating the at least one second heating element at one or more second temperatures for one or more corresponding second time periods during a second stage of preparing the liquid product or the food product.

9. The automatic cooking machine according to claim 8, wherein the combined food product comprises Kabsa and a total time period for the first stage is about 1.5 hours and a total time period for the second stage is about 0.5 hours.

10. The automatic cooking machine according to claim 8, wherein the at least one second heating element heats the plurality of containers including the combined liquid or the combined food material simultaneously during the second stage.

11. The automatic cooking machine according to claim 10, wherein the at least one second heating element heats the plurality of containers at respective different temperatures for each container simultaneously during the second stage.

12. The automatic cooking machine according to claim 8, wherein the at least one second heating element heats the plurality of containers including the combined liquid or the combined food material at respective different temperatures simultaneously during the second stage.

13. The automatic cooking machine according to claim 8, wherein the plurality of containers are selectively removable from the lower area of the housing.

14. The automatic cooking machine according to claim 13, further comprising:
   a holding member to removably support the elongate member when positioned in the upper area of the housing.

15. The automatic cooking machine according to claim 1, further comprising:
   a holding member to support the elongate member when positioned in the upper area of the housing.

16. The automatic cooking machine according to claim 1, wherein the controller comprises a control system including a memory, an interface, a processor, and a display.

\* \* \* \* \*